US009622408B1

(12) United States Patent
Miller et al.

(10) Patent No.: US 9,622,408 B1
(45) Date of Patent: Apr. 18, 2017

(54) HARVESTER REVERSING ENGINE FAN

(71) Applicant: Deere & Company, Moline, IL (US)

(72) Inventors: Shaun J. Miller, Woodward, IA (US);
Robert C. Blad, Ankeny, IA (US);
Mark A. Cracraft, Johnston, IA (US);
James T. Noonan, Bondurant, IA (US);
Cole D. Miller, Ankeny, IA (US);
Darren J. Cruchelow, Ankeny, IA
(US); Steven D. Wallestad, Ankeny, IA
(US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/922,288

(22) Filed: Oct. 26, 2015

(51) Int. Cl.
*F04D 27/00* (2006.01)
*A01D 41/127* (2006.01)
*F04D 29/36* (2006.01)
*F04D 29/32* (2006.01)
*A01D 61/00* (2006.01)

(52) U.S. Cl.
CPC ........... *A01D 41/127* (2013.01); *A01D 61/00* (2013.01); *F04D 29/325* (2013.01); *F04D 29/362* (2013.01)

(58) Field of Classification Search
CPC ... A01D 41/127; F04D 29/362; F04D 29/325; F04D 61/00
See application file for complete search history.

(56) References Cited

U.S. PATENT DOCUMENTS

| 2,734,493 | A | 2/1956 | Findley |
| 4,223,846 | A * | 9/1980 | Priepke ................. A01F 29/10 241/101.742 |
| 6,729,844 | B2 | 5/2004 | Bettencourt |
| 7,008,184 | B2 | 3/2006 | Bettencourt, Jr. et al. |
| 8,502,491 | B2 * | 8/2013 | Horng ................ G05D 23/1919 310/156.12 |
| 2012/0240878 | A1 | 9/2012 | Hagele et al. |

\* cited by examiner

*Primary Examiner* — Richard Camby

(57) ABSTRACT

A control system for controlling a pitch of a plurality of fan blades of a variable pitch fan driven by an engine of a harvester. The control system comprises first, second, and third feedback devices that provide first, second, and third feedback signals indicative of at least one harvester temperature, an ambient temperature, and an engine load. A controller is operable to receive the first, second, and third feedback signals, lookup an initial pitch setting, generate an initial pitch setting signal, and compare the harvester temperature to a harvester temperature limit and generate a fan reversal signal if certain conditions are met.

20 Claims, 5 Drawing Sheets

HARVESTER REVERSING ENGINE FAN

FIELD OF THE DISCLOSURE

The present disclosure generally relates to harvesters, and more particularly to a system and method for controlling harvester fan speed based on yield.

BACKGROUND OF THE DISCLOSURE

In order to harvest crops, engine and fan speeds of harvesters are commonly set at constant speeds regardless of yield.

SUMMARY OF THE DISCLOSURE

In one embodiment, a control system for controlling a pitch of a plurality of fan blades of a variable pitch fan is disclosed. The variable pitch fan is driven by an engine of a harvester. The variable pitch fan is configured to create an airflow in a first direction. The control system comprises a first feedback device providing a first feedback signal indicative of at least one harvester temperature. A second feedback device is provided that provides a second feedback signal indicative of an ambient temperature. A third feedback device is provided that provides a third feedback signal indicative of an engine load. A controller operable to receive the first feedback signal, the second feedback signal, and the third feedback signal. Lookup an initial pitch setting from a lookup table using the engine load and the ambient temperature. Generate an initial pitch setting signal to set the pitch of the plurality of fan blades equal to the initial pitch setting. Compare the harvester temperature to a harvester temperature limit and generate a fan reversal signal if the harvester temperature is at least one of equal to and greater than the harvester temperature limit. The fan reversal signal is configured to temporarily cause the pitch of the plurality of fan blades to change in order to cause the airflow to flow in a second direction, opposite the first direction, before causing the airflow to revert back to flowing in the first direction. Record a timer interval between successive fan reversal signals. Determine whether the timer interval has increased and if so, generate a later pitch setting signal to change the pitch of the plurality of fan blades to a later pitch setting that is incrementally different than a prior pitch setting but in the same direction of blades in the opposite direction of change at the later pitch setting.

In another embodiment, a method for controlling a pitch of fan blades of a variable pitch fan driven by an engine of a harvester using a control system having a controller is disclosed. The method comprises receiving a first feedback signal indicative of at least one harvester temperature from a first feedback device. Receiving a second feedback signal indicative of an ambient temperature from a second feedback device. Receiving a third feedback signal indicative of an engine load from a third feedback device. Looking up an initial pitch setting from a lookup table using the engine load and the ambient temperature. Generating an initial pitch setting signal to set the pitch of the fan blades equal to the initial pitch setting. Comparing the harvester temperature to a harvester temperature limit and generate a fan reversal signal if the harvester temperature is at least one of equal to and greater than the harvester temperature limit. The fan reversal signal is configured to temporarily cause the pitch of the plurality of fan blades to change in order to cause the airflow to flow in a second direction, opposite the first direction, before causing the airflow to revert back to flowing in the first direction. Recording a timer interval between successive fan reversal signals. Determining whether the timer interval has increased and if so, generating a later pitch setting signal to change the pitch of the plurality of fan blades to a later pitch setting that is incrementally different than a prior pitch setting but in the same direction of change, and if not, generating the later pitch setting signal to set the pitch of the fan blades in the opposite direction of change at the later pitch setting.

In yet another embodiment, a harvester is disclosed. The harvester comprises a harvesting structure for harvesting crop. A crop receptacle for receiving harvested crop and a power module for providing power are provided. The harvester also comprises a control system for controlling a pitch of a plurality of fan blades of a variable pitch fan. The variable pitch fan is driven by an engine of a harvester. The variable pitch fan is configured to create an airflow in a first direction. The control system comprises a first feedback device providing a first feedback signal indicative of at least one harvester temperature. A second feedback device is provided that provides a second feedback signal indicative of an ambient temperature. A third feedback device is provided that provides a third feedback signal indicative of an engine load. A controller operable to receive the first feedback signal, the second feedback signal, and the third feedback signal. Lookup an initial pitch setting from a lookup table using the engine load and the ambient temperature. Generate an initial pitch setting signal to set the pitch of the plurality of fan blades equal to the initial pitch setting. Compare the harvester temperature to a harvester temperature limit and generate a fan reversal signal if the harvester temperature is at least one of equal to and greater than the harvester temperature limit. The fan reversal signal is configured to temporarily cause the pitch of the plurality of fan blades to change in order to cause the airflow to flow in a second direction, opposite the first direction, before causing the airflow to revert back to flowing in the first direction. Record a timer interval between successive fan reversal signals. Determine whether the timer interval has increased and if so, generate a later pitch setting signal to change the pitch of the plurality of fan blades to a later pitch setting that is incrementally different than a prior pitch setting but in the same direction of change, and if not, generate the later pitch setting signal to set the pitch of the fan blades in the opposite direction of change at the later pitch setting.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
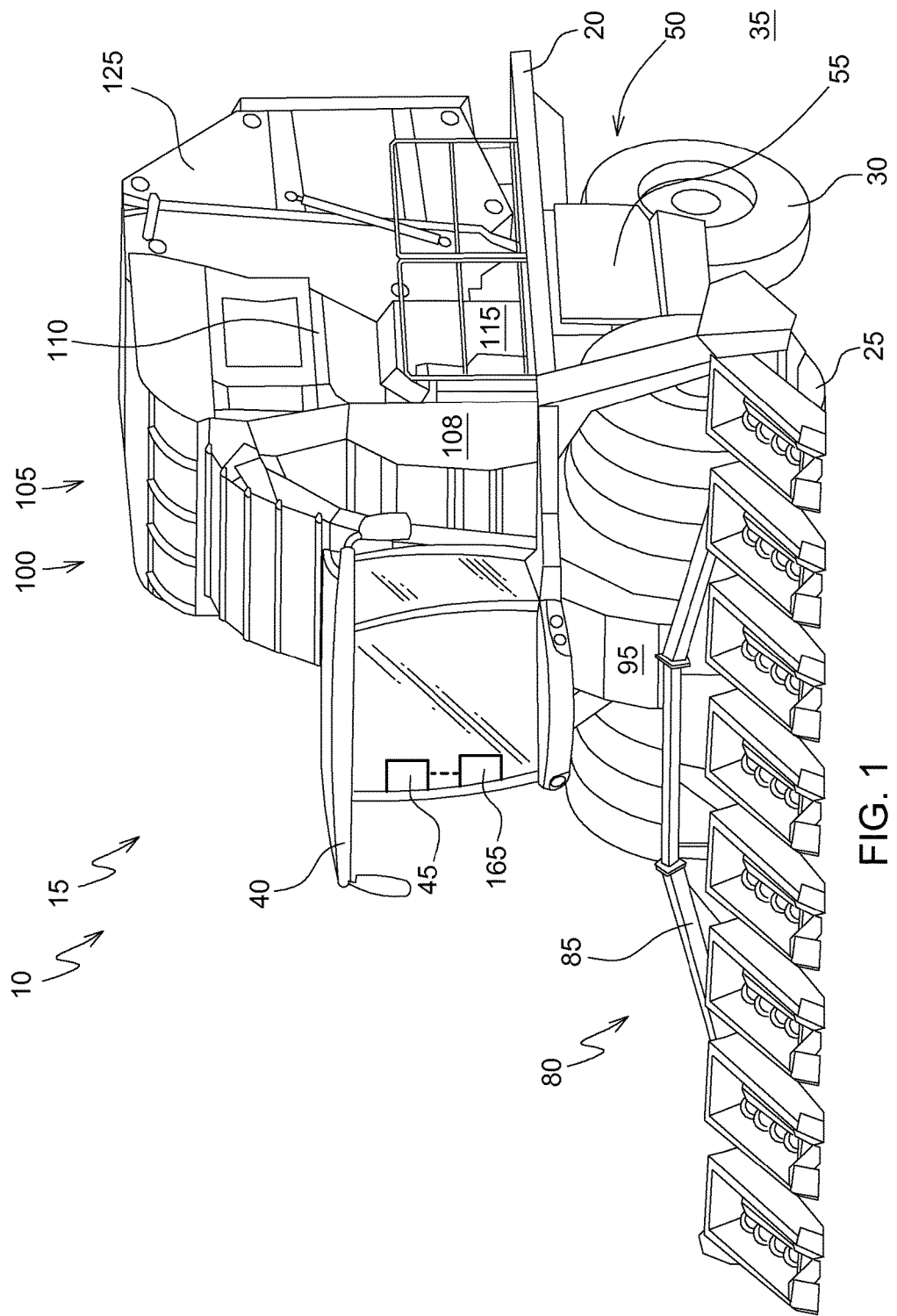
FIG. 1 is a perspective view of a harvester according to one embodiment.
Figure 2:
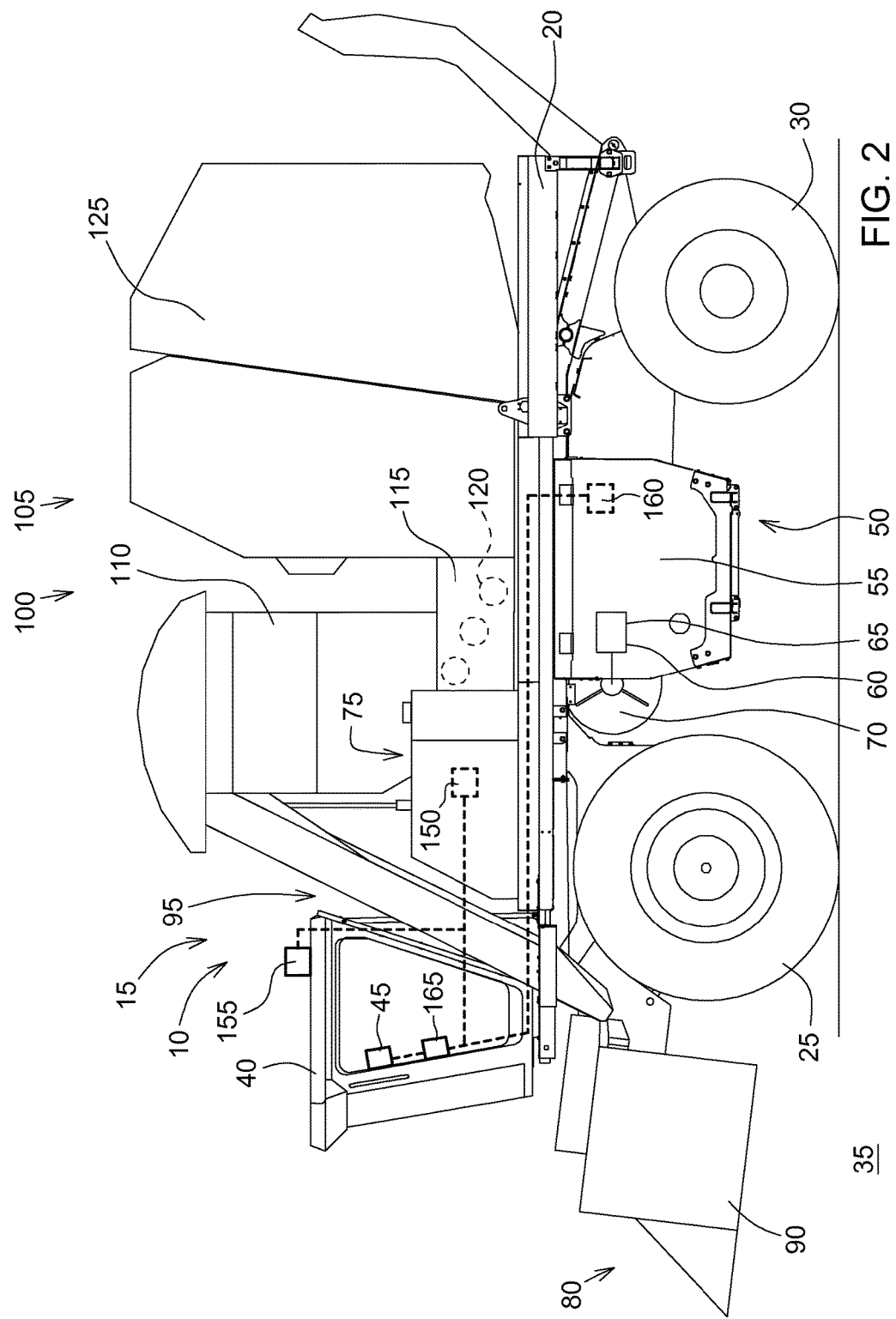
FIG. 2 is a side view of a harvester according to another embodiment.

FIGS. 1 and 2 illustrate a harvester 10. The illustrated harvester 10 is a cotton harvester 15 (e.g., cotton picker, cotton stripper). Other types of harvesters 10 are contemplated by this disclosure (e.g., combine).

The harvester 10 includes a chassis 20. The illustrated chassis 20 is supported by front wheels 25 and rear wheels 30 although other support is contemplated (e.g., tracks). The harvester 10 is adapted for movement through a field 35 to harvest crops (e.g., cotton, corn, stover, hay, and alfalfa). An operator station 40 is supported by the chassis 20. An operator interface 45 is positioned in the operator station 40.

Referring to FIG. 2, a power module 50 may be supported below the chassis 20. The power module may be an engine 55 that drives a hydraulic motor 60 or a mechanical drive 65 to power a variable pitch fan 70. An operator may set a minimum power for the power module 50 from the operator interface 45. The operator may also set a minimum engine speed from the operator interface 45. Water, lubricant, and fuel tanks, indicated generally at 75, may be supported on the chassis 20.

A harvesting structure 80 is coupleable to the chassis 20. The illustrated harvesting structure 80 is configured to remove cotton from the field 35. The harvesting structure 80 may be a cotton stripper header 85 (FIG. 1), one or more cotton picking units 90 (FIG. 2), or another harvesting structure 80 (e.g., corn head). Alternatively, the harvesting structure 80 may be configured to remove corn, or other crop.

With reference to FIGS. 1 and 2, an air duct system 95 is coupleable to the harvesting structure 80. A crop receptacle 100 is coupleable to the air duct system 95. Referring to FIG. 1, the illustrated crop receptacle 100 is a round module builder 105. Alternatively, the crop receptacle 100 may be a basket (not shown). The illustrated round module builder 105 includes a cleaner 108 that cleans the cotton harvested from the cotton stripper header 85 by removing trash and debris. With reference to FIG. 2, the round module builder 105 includes an accumulator 110 that is configured to receive cotton, or other crop, harvested by the cotton picking units 90.

With continued reference to FIG. 2, a feeder 115 is coupleable to the chassis 20. The feeder 115 is configured to receive cotton, or other crop, from the accumulator 110. The feeder 115 includes a plurality of rollers 120 configured to compress the cotton, or other crop, and transfer the cotton, or other crop, to a baler 125 of the round module builder 105.

Figure 3:
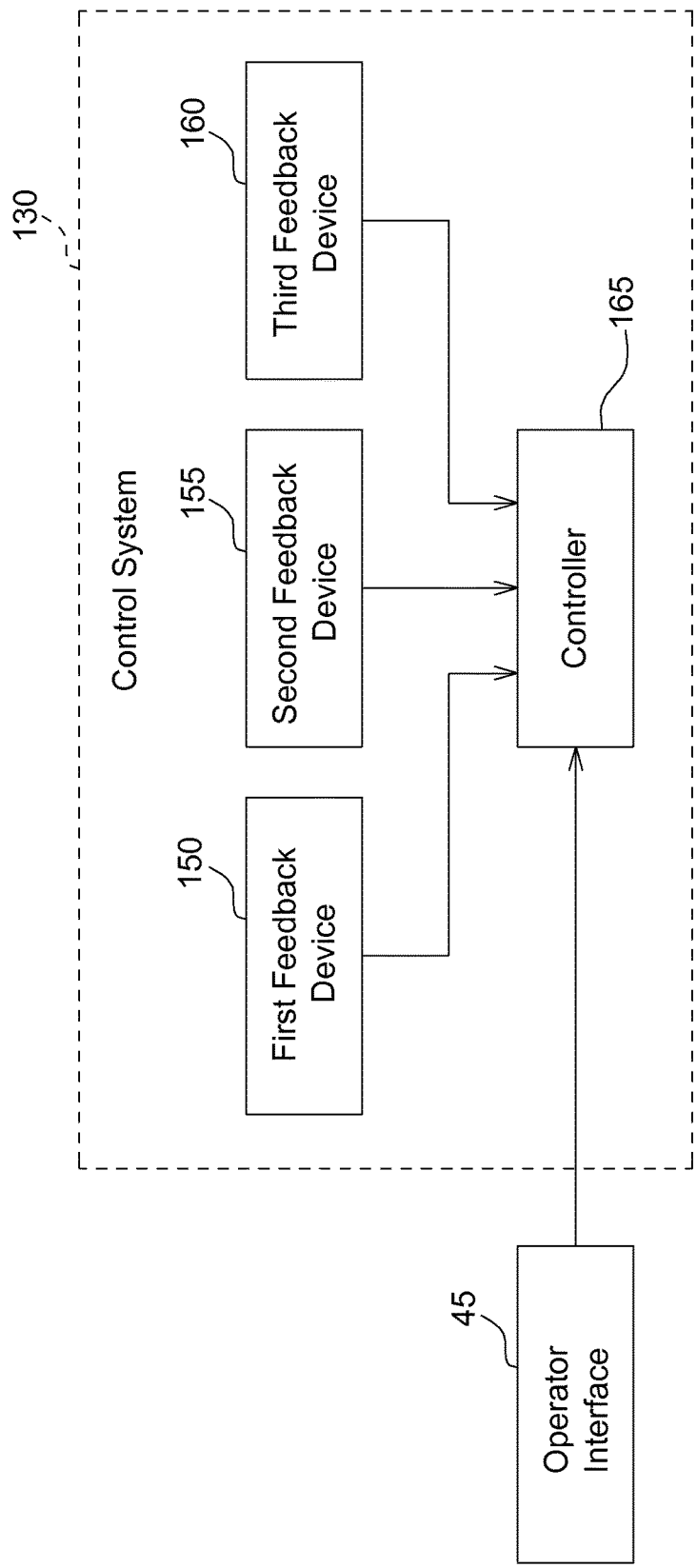
FIG. 3 is a schematic of a control system of a harvester according to another embodiment.
Figure 4:
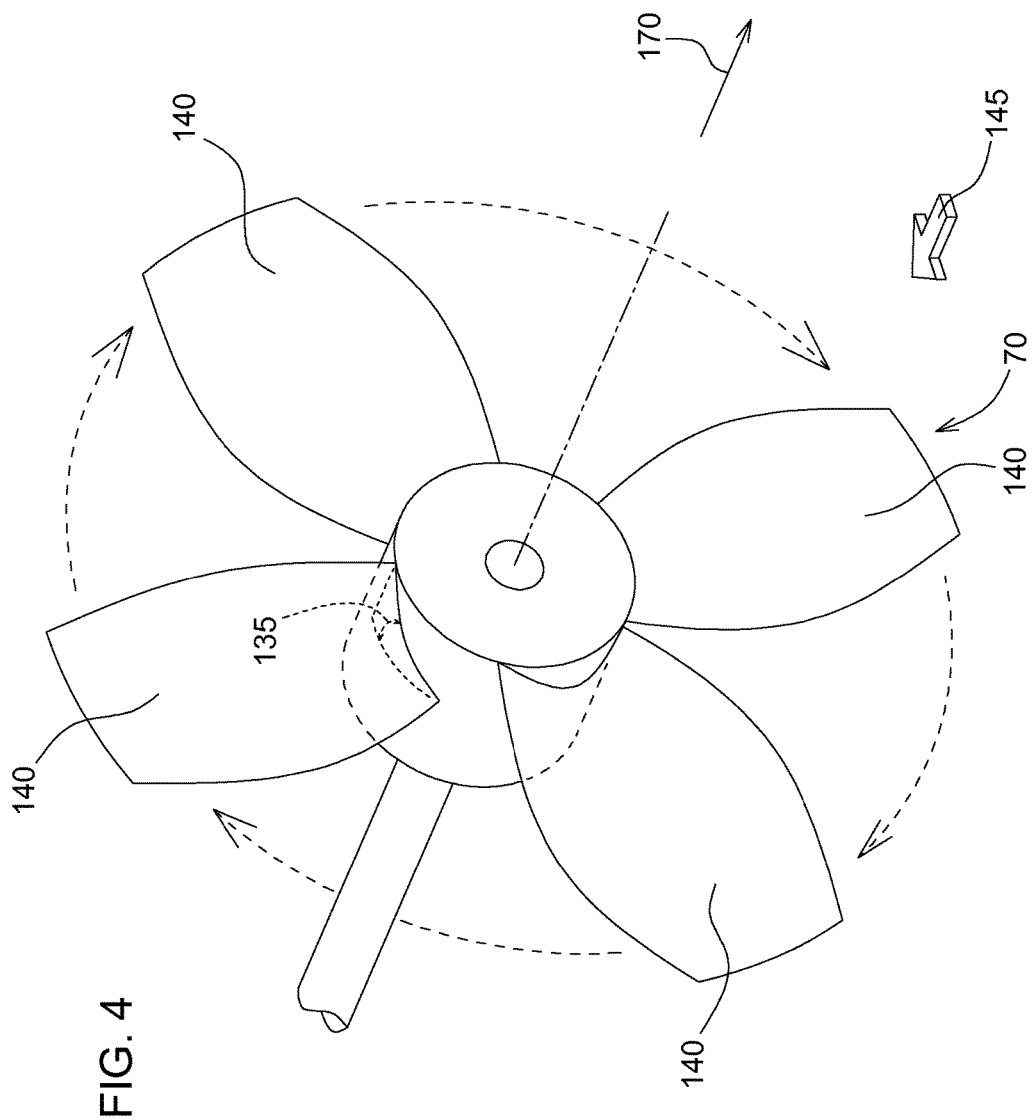
FIG. 4 is a partial view of a variable pitch fan according to one embodiment.

Referring to FIGS. 3 and 4, the harvester 10 has a control system 130 for controlling a pitch 135 of a plurality of fan blades 140 of the variable pitch fan 70 is disclosed. The variable pitch fan 70 is driven by the engine 55 of the harvester 10. The variable pitch fan 70 is configured to create an airflow in a first direction 145.

With reference to FIG. 3, the control system 130 comprises a first feedback device 150 providing a first feedback signal indicative of at least one harvester temperature. The harvester temperature is at least one of a hydraulic reservoir temperature, a pump drive gearbox reservoir temperature, a transmission sump temperature, an engine charge air temperature, and an engine coolant temperature.

A second feedback device 155 is provided that provides a second feedback signal indicative of an ambient temperature. A third feedback device 160 is provided that provides a third feedback signal indicative of an engine load. The third feedback signal may be indicative of a percent engine load. A controller 165 is provided to receive the first, second, and third feedback signals. The controller 165 is operable to lookup an initial pitch setting from a lookup table using the engine load and the ambient temperature. The controller 165 generates an initial pitch setting signal to set the pitch of the plurality of fan blades 140 equal to the initial pitch setting. The controller 165 compares the harvester temperature to a harvester temperature limit and generates a fan reversal signal if the harvester temperature is at least one of equal to and greater than the harvester temperature limit. The fan reversal signal is configured to temporarily cause the pitch 135 of the plurality of fan blades 140 to change in order to cause the airflow to flow in a second direction 170, opposite the first direction 145, before causing the airflow to revert back to flowing in the first direction 145. The fan reversal signal may cause the pitch 135 to change to a maximum pitch. The controller 165 is operable to record a timer interval between successive fan reversal signals and determine whether the timer interval has increased and if so, generate a later pitch setting signal to change the pitch 135 of the plurality of fan blades 140 to a later pitch setting that is incrementally different than a prior pitch setting but in the same direction of change, and if not, generate the later pitch setting signal to set the pitch 135 of the plurality of fan blades 140 in the opposite direction of change at the later pitch setting.

Alternatively, the fan reversal signal may be generated when a module eject cycle is initiated by the cotton harvester 15. The operator interface 45 may be used to generate a manual mode signal that is received by the controller 165 and causes the controller 165 to generate the fan reversal signal. Alternatively, the operator interface 45 may be used to set a reversal timeframe that is received by the controller 165 and sets the amount of time that the pitch 135 is changed due to the fan reversal signal.

Figure 5:
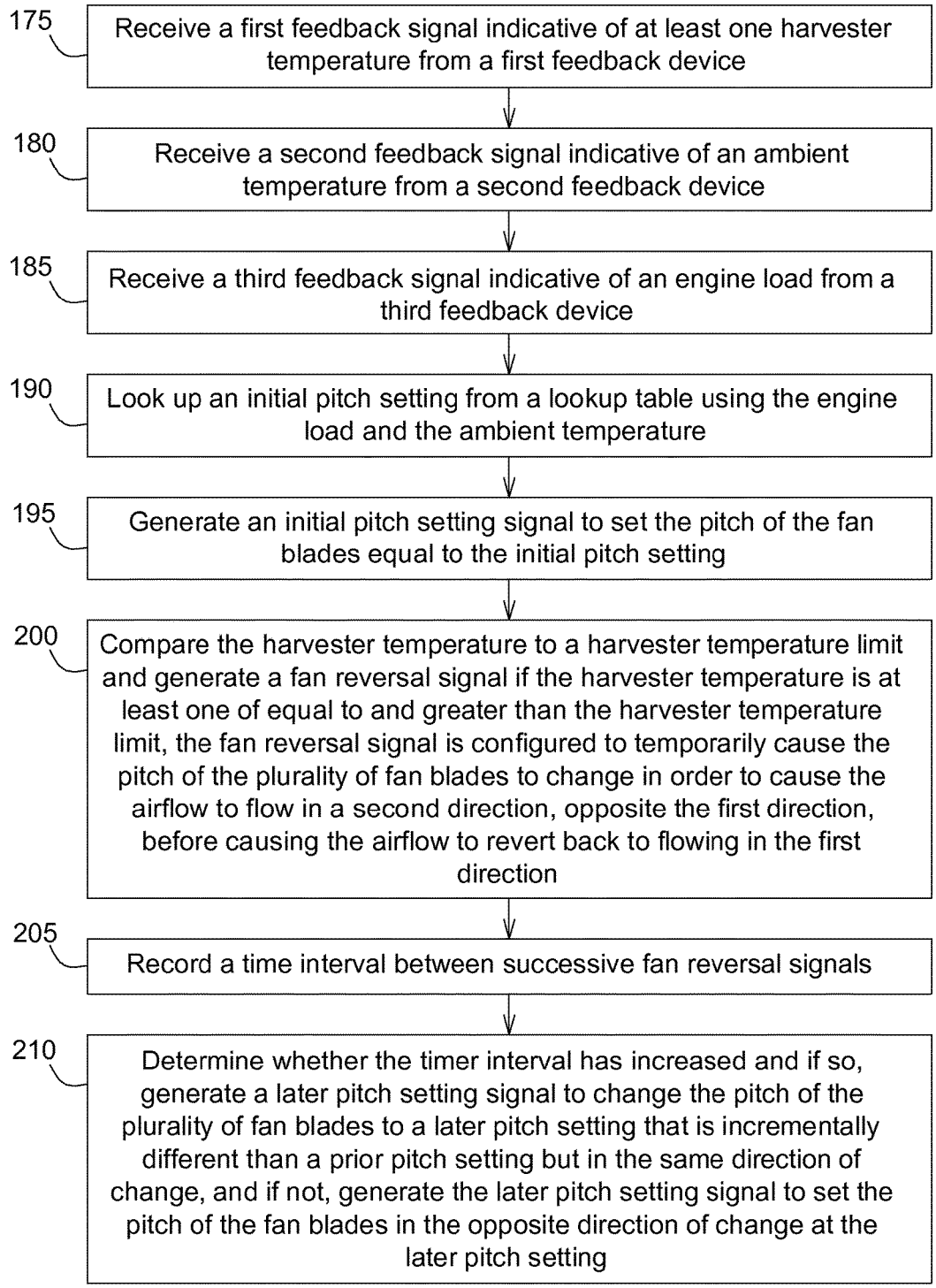
FIG. 5 is a schematic of an illustrative method for harvesting crop.

A method for controlling the pitch 135 of the plurality of fan blades 140 of the variable pitch fan 70 is illustrated in FIG. 5. In step 175 the first feedback signal is received. In step 180, the second feedback signal is received. In step 185, the third feedback signal is received. In step 190, an initial pitch setting is looked up from a lookup table using the engine load and the ambient temperature. In step 195, an initial pitch setting signal is generated to set the pitch of the plurality of fan blades equal to the initial pitch setting. In step 200, the harvester temperature is compared to a harvester temperature limit and a fan reversal signal is generated if the harvester temperature is at least one of equal to and greater than the harvester temperature limit. The fan reversal signal is configured to temporarily cause the pitch of the plurality of fan blades to change in order to cause the airflow to flow in a second direction, opposite the first direction, before causing the airflow to revert back to flowing in the first direction. The fan reversal signal may be configured to cause the pitch of the plurality of fan blades to change to a maximum pitch causing the airflow to flow in the second direction. In an embodiment where the harvester is a cotton harvester, the fan reversal signal may be generated when a module eject cycle is initiated. The harvester may have an operator interface for generating a manual mode signal that is received by the controller and causes the controller to generate the fan reversal signal. Alternatively, the operator interface may enable setting a reversal timeframe that is received by the controller and sets the amount of time that the pitch of the plurality of fan blades are changed due to the fan reversal signal.

In step 205, a timer interval is recorded between successive fan reversal signals. In step 210, it is determined whether the timer interval has increased and if so, a later pitch setting signal is generated to change the pitch of the plurality of fan blades to a later pitch setting that is incrementally different than a prior pitch setting but in the same direction of change, and if not, the later pitch setting signal is generated to set the pitch of the fan blades in the opposite direction of change at the later pitch setting.

Various features are set forth in the following claims.

What is claimed is:

1. A control system for controlling a pitch of a plurality of fan blades of a variable pitch fan driven by an engine of a harvester, the variable pitch fan configured to create an airflow in a first direction, the control system comprising:
    a first feedback device providing a first feedback signal indicative of at least one harvester temperature;
    a second feedback device providing a second feedback signal indicative of an ambient temperature;
    a third feedback device providing a third feedback signal indicative of an engine load; and
    a controller operable to:
        receive the first feedback signal, the second feedback signal, and the third feedback signal;
        lookup an initial pitch setting from a lookup table using the engine load and the ambient temperature;
        generate an initial pitch setting signal to set the pitch of the plurality of fan blades equal to the initial pitch setting;
        compare the harvester temperature to a harvester temperature limit and generate a fan reversal signal if the harvester temperature is at least one of equal to and greater than the harvester temperature limit, the fan reversal signal is configured to temporarily cause the pitch of the plurality of fan blades to change in order to cause the airflow to flow in a second direction, opposite the first direction, before causing the airflow to revert back to flowing in the first direction;
        record a timer interval between successive fan reversal signals;
        determine whether the timer interval has increased and if so, generate a later pitch setting signal to change the pitch of the plurality of fan blades to a later pitch setting that is incrementally different than a prior pitch setting but in the same direction of change, and if not, generate the later pitch setting signal to set the pitch of the fan blades in the opposite direction of change at the later pitch setting.

2. The control system of claim 1, wherein the harvester temperature is at least one of a hydraulic reservoir temperature, a pump drive gearbox reservoir temperature, a transmission sump temperature, an engine charge air temperature, and an engine coolant temperature.

3. The control system of claim 1, wherein the third feedback signal is indicative of a percent engine load.

4. The control system of claim 1, wherein the fan reversal signal is configured to cause the pitch of the plurality of fan blades to change to a maximum pitch causing the airflow to flow in the second direction.

5. The control system of claim 1, wherein the control system is included in a cotton harvester and the fan reversal signal is generated when a module eject cycle is initiated.

6. The control system of claim 1, wherein the control system is included in a cotton harvester having an operator interface for generating a manual mode signal that is received by the controller and causes the controller to generate the fan reversal signal.

7. The control system of claim 1, wherein the control system is included in a cotton harvester having an operator interface for setting a reversal timeframe that is received by the controller and sets the amount of time that the pitch of the plurality of fan blades are changed due to the fan reversal signal.

8. A method for controlling a pitch of fan blades of a variable pitch fan driven by an engine of a harvester using a control system having a controller, the method comprising:
    receiving a first feedback signal indicative of at least one harvester temperature from a first feedback device;
    receiving a second feedback signal indicative of an ambient temperature from a second feedback device;
    receiving a third feedback signal indicative of an engine load from a third feedback device; and
    looking up an initial pitch setting from a lookup table using the engine load and the ambient temperature;
    generating an initial pitch setting signal to set the pitch of the fan blades equal to the initial pitch setting;
    comparing the harvester temperature to a harvester temperature limit and generating a fan reversal signal if the harvester temperature is at least one of equal to and greater than the harvester temperature limit, the fan reversal signal is configured to temporarily cause the pitch of the plurality of fan blades to change in order to cause the airflow to flow in a second direction, opposite the first direction, before causing the airflow to revert back to flowing in the first direction;
    recording a timer interval between successive fan reversal signals; and
    determining whether the timer interval has increased and if so, generating a later pitch setting signal to change the pitch of the plurality of fan blades to a later pitch setting that is incrementally different than a prior pitch setting but in the same direction of change, and if not, generating the later pitch setting signal to set the pitch of the fan blades in the opposite direction of change at the later pitch setting.

9. The method of claim 8, wherein the harvester temperature is at least one of a hydraulic reservoir temperature, a pump drive gearbox reservoir temperature, a transmission sump temperature, an engine charge air temperature, and an engine coolant temperature.

10. The method of claim 8, wherein the third feedback signal is indicative of a percent engine load.

11. The method of claim 8, wherein the fan reversal signal is configured to cause the pitch of the plurality of fan blades to change to a maximum pitch causing the airflow to flow in the second direction.

12. The method of claim 8, wherein the control system is included in a cotton harvester and the fan reversal signal is generated when a module eject cycle is initiated.

13. The method of claim 8, wherein the control system is included in a cotton harvester having an operator interface for generating a manual mode signal that is received by the controller and causes the controller to generate the fan reversal signal.

14. The method of claim 8, wherein the control system is included in a cotton harvester having an operator interface for setting a reversal timeframe that is received by the controller and sets the amount of time that the pitch of the plurality of fan blades are changed due to the fan reversal signal.

15. A harvester comprising:
a harvesting structure for harvesting crop;
a crop receptacle for receiving harvested crop;
a power module for providing power;
a control system comprising:
   a first feedback device providing a first feedback signal indicative of at least one harvester temperature;
   a second feedback device providing a second feedback signal indicative of an ambient temperature;
   a third feedback device providing a third feedback signal indicative of an engine load; and
   a controller operable to:
      receive the first feedback signal, the second feedback signal, and the third feedback signal;
      lookup an initial pitch setting from a lookup table using the engine load and the ambient temperature;
      generate an initial pitch setting signal to set the pitch of the fan blades equal to the initial pitch setting;
      compare the harvester temperature to a harvester temperature limit and generate a fan reversal signal if the harvester temperature is at least one of equal to and greater than the harvester temperature limit, the fan reversal signal is configured to cause the fan to reverse an airflow direction for a period of time before reverting back to the airflow direction;
      record a timer interval between successive fan reversal signals;
      determine whether the timer interval has increased and if so,
      generate a later pitch setting signal to set the pitch of the fan blades in the same direction at a later pitch setting that is incrementally different, and if not, generate the later pitch setting signal to set the pitch of the fan blades in the opposite direction at the incrementally different pitch.

16. The harvester of claim 15, wherein the harvester is a cotton harvester and the harvesting structure is at least one of a cotton picking unit and a cotton stripper header.

17. The harvester of claim 15, wherein the harvester temperature is at least one of a hydraulic reservoir temperature, a pump drive gearbox reservoir temperature, a transmission sump temperature, an engine charge air temperature, and an engine coolant temperature.

18. The harvester of claim 15, wherein the third feedback signal is indicative of a percent engine load.

19. The harvester of claim 15, wherein the fan reversal signal is configured to cause the pitch of the plurality of fan blades to change to a maximum pitch causing the airflow to flow in the second direction.

20. The harvester of claim 15, further comprising an operator interface for generating a manual mode signal that is received by the controller and causes the controller to generate the fan reversal signal.

\* \* \* \* \*